US012060981B2

(12) United States Patent
Maldoner et al.

(10) Patent No.: US 12,060,981 B2
(45) Date of Patent: Aug. 13, 2024

(54) ADAPTER FOR ELECTRICALLY CONNECTING A LIGHTING DEVICE TO AN ELECTRICAL TRACK, LIGHTING SYSTEM COMPRISING SUCH AN ADAPTER AND AN ELECTRICAL TRACK

(71) Applicant: Tridonic GmbH & Co KG, Dornbirn (AT)

(72) Inventors: Jakob Maldoner, Stegg (AT); Oliver Wynnyczenko, Lustenau (AT)

(73) Assignee: Tridonic GmbH & Co KG, Dornbirn (AT)

(*) Notice: Subject to any disclaimer, the term of this patent is extended or adjusted under 35 U.S.C. 154(b) by 300 days.

(21) Appl. No.: 17/629,021

(22) PCT Filed: Aug. 6, 2020

(86) PCT No.: PCT/EP2020/072083
§ 371 (c)(1),
(2) Date: Jan. 21, 2022

(87) PCT Pub. No.: WO2021/043526
PCT Pub. Date: Mar. 11, 2021

(65) Prior Publication Data
US 2022/0268409 A1 Aug. 25, 2022

(30) Foreign Application Priority Data
Aug. 30, 2019 (EP) .................................... 19194583

(51) Int. Cl.
*F21V 23/06* (2006.01)
*F21S 8/06* (2006.01)
(Continued)

(52) U.S. Cl.
CPC .............. *F21S 8/066* (2013.01); *F21V 23/06* (2013.01); *H01R 13/447* (2013.01); (Continued)

(58) Field of Classification Search
None
See application file for complete search history.

(56) References Cited

U.S. PATENT DOCUMENTS 3,613,045 A * 10/1971 Routh .................. H01R 25/142 439/677
4,822,292 A * 4/1989 Thayer ................. H01R 25/142 439/115
(Continued)

FOREIGN PATENT DOCUMENTS

DE 3910881 10/1990
EP 3217090 9/2017
WO WO-0191250 A1 * 11/2001 ........... H01R 25/162

OTHER PUBLICATIONS

EP19194583.1, European Search Report dated Feb. 20, 2019, 5 pages.
(Continued)

*Primary Examiner* — Tho D Ta
(74) *Attorney, Agent, or Firm* — Andrus Intellectual Property Law, LLP

(57) ABSTRACT

The present invention relates to an adapter (1) for connecting a light to a track having mains phases and comprising a housing (2), at least one spring-loaded connector (6.1) linked to the housing (2), and a cover (4) partially covering the housing (2) and having at least one opening (8.1). The cover (4) is displaceable so as to be placed selectively in one of: a position in which the at least one spring-loaded connector (6.1) extends at least partially through the at least one opening (8.1), a position in which the cover (4) covers the at least one spring-loaded connector (6.1).

17 Claims, 17 Drawing Sheets

(51) Int. Cl.

| | |
|---|---|
| ***H01R 13/447*** | (2006.01) |
| ***H01R 25/14*** | (2006.01) |
| ***H01R 29/00*** | (2006.01) |
| *F21V 21/005* | (2006.01) |

(52) U.S. Cl.

CPC ........... *H01R 25/142* (2013.01); *H01R 29/00* (2013.01); *F21V 21/005* (2013.01)

(56) References Cited

U.S. PATENT DOCUMENTS

| | | | | |
|---|---|---|---|---|
| 8,755,305 | B2 * | 6/2014 | Altekar ................ | H01R 25/142<br>370/254 |
| 10,168,036 | B2 * | 1/2019 | Wang ...................... | F21V 21/34 |

OTHER PUBLICATIONS

PCT/EP2020/072083, International Search Report and Written Opinion dated Oct. 19, 2020, 8 pages.

* cited by examiner

ADAPTER FOR ELECTRICALLY CONNECTING A LIGHTING DEVICE TO AN ELECTRICAL TRACK, LIGHTING SYSTEM COMPRISING SUCH AN ADAPTER AND AN ELECTRICAL TRACK

CROSS REFERENCE TO RELATED APPLICATIONS

The present application is the U.S. national stage application of international application PCT/EP2020/072083 filed Aug. 6, 2020, which international application was published on Mar. 11, 2021 as International Publication WO 2021/043526 A1. The international application claims priority to European Patent Application 19194583.1 filed Aug. 30, 2019.

FIELD OF THE INVENTION

The present invention relates to an adapter for electrically connecting a lighting device to an electrical track having mains phases. Further, the present invention relates to a lighting system comprising an electrical track having mains phases and at least one such adapter.

BACKGROUND OF THE INVENTION

EP3217090A1 proposes a lighting system comprising an electrical track having three mains phases and an adapter for electrically connecting a lighting device to the electrical track, such that the lighting device may receive electrical power from the mains. The adapter supports the lighting device, for example a spotlight. The electrical track may hold several adapters, hence several lighting devices, which are for example arranged in a row. In order to enable an operator to adjust the number and locations of the adapters on the electrical track, the adapter includes a mechanism configured for extracting contacts automatically when the adapter is fitted in the electrical track, such that the contacts are electrically connected to the three mains phases.

However, the known adapter presents some drawbacks and limitations. First, it has a relatively complex structure and it requires numerous components, thus increasing the cost and footprint of the lighting system. Also, the automatic connection of the contacts to the three mains phases limits the flexibility in the electrical connection possibilities.

SUMMARY OF THE INVENTION

In view of the above-mentioned drawbacks and limitations, the present invention aims to improve the existing implementations of lighting systems and adapters. An objective is to enable to connect the adapter to a selected one of the mains phases, while offering both a simpler structure for electrically connecting the adapter to the electrical track and a more flexible arrangement of the adapters in the electrical track.

The objective is achieved by the embodiments defined in the independent claims. Advantageous implementations are further defined in the dependent claims.

An embodiment of the invention provides an adapter, for electrically connecting a lighting device to an electrical track having mains phases, the adapter comprising at least:

a housing at least one spring-loaded connector linked to the housing, and a cover configured to partially cover the housing, the cover having at least one opening, wherein the cover is displaceable relative to the housing so as to be placed selectively in at least one of:

a position in which the at least one spring-loaded connector extends at least partially through the at least one opening, a position in which the cover covers the at least one spring-loaded connector.

Thus, an operator may select to connect or disconnect the spring-loaded connector to the mains phase when the adapter is assembled with the electrical track. Also, the spring-loaded connector may provide for a simple, direct connection to a conductor, for example a wire, providing the mains phase in the electrical track.

Throughout the present application, the term "connect" and its derivatives relate to an electrical connection.

In various implementations, the adapter may comprise at least:

a first spring-loaded connector linked to the housing and a second spring-loaded connector linked to the housing, wherein the cover has at least two openings, wherein the cover may be displaceable relative to the housing so as to be placed selectively at least in one of:

a first connection position, in which the first spring-loaded connector extends at least partially through a respective opening while the cover covers the second spring-loaded connector, and a second connection position, in which the second spring-loaded connector extends at least partially through a respective opening while the cover covers the first spring-loaded connector.

Thus, an operator may select which mains phase, among two, the adapter will be connected to when assembled with the electrical track. Also, the first and second spring-loaded connectors may provide for a simple, direct connection to conductors providing the mains phase in the electrical track.

In various implementations, the adapter may further comprise a third spring-loaded connector linked to the housing, wherein the cover may be displaceable relative to the housing so as to be placed selectively in at least one of:

- a first connection position, in which the first spring-loaded connector extends at least partially through a respective opening while the cover covers the second and third spring-loaded connectors,
- a second connection position, in which the second spring-loaded connector extends at least partially through a respective opening while the cover covers the first and third spring-loaded connectors, and
- a third connection position, in which the third spring-loaded connector extends at least partially through a respective opening while the cover covers the first and second spring-loaded connectors.

Thus, an operator may select which mains phase the adapter will be connected to when assembled with the electrical track. Also, the spring-loaded connectors may provide for a simple, direct connection to conductors providing the mains phase in the electrical track.

In some implementations, the or each spring-loaded connector, i.e. the first, the second and/or the third spring-loaded connector(s), may extend at least partially out of said respective openings.

In some implementations, the or each spring-loaded connector, i.e. the first, the second and/or the third spring-loaded connector(s), may be elastically movable between a retracted position and an extended position, the spring-loaded connector being i) in its retracted position when it is covered by the cover and ii) in its extended position when extending through or, as the case may be, out of a respective opening. In the extended position, the respective spring-loaded connector may contact one of the mains phases.

In various implementations, the at least two openings may include at least a first opening and a second opening and, preferably, a third opening, the first and the second and, when present, the third openings being arranged on the cover such that:

in the first connection position, the first spring-loaded connector may extend at least partially through the first opening, in the second connection position, the second spring-loaded connector may extend at least partially through the second opening, and preferably, in the third connection position, the third spring-loaded connector may extend at least partially through the third opening.

In various implementations, at least one of the first, the second and, when present, the third spring-loaded connectors may be linked to a first lateral region of the housing, the remaining spring-loaded connectors being linked to a second lateral region of the housing located opposite the first lateral region of the housing, the cover being configured to partially cover the first and second lateral regions of the housing.

Thus, the arrangement of the spring-loaded connectors respectively on the opposite first and second lateral regions of the housing make it possible to design a small, compact housing.

In various implementations, the cover may be displaceable relative to the housing so as to be placed selectively in a disconnection position, in which the cover covers the at least one spring-loaded connector, including, when respectively present, the first, the second and the third spring-loaded connectors.

Thus, such a disconnection position enables the operator to safely assemble the adapter with the electrical track before selecting a connection position for allowing the power from a mains phase to be supplied to the lighting device.

In various implementations, the cover may be displaceable relative to the housing in translation between said at least two positions, preferably between the first and the second connection positions, more preferably between the first, the second and the third connection positions.

Thus, the displacement of the cover may be operated easily and the design of the adapter may be simple.

In some implementations, the translation may be rectilinear. Alternatively, the translation may be curvilinear.

In some implementations, the cover may be displaceable relative to the housing over a distance ranging from 30 mm to 200 mm. This distance may be adjusted as a function of the size and position of the electrical track, in particular of the wires conducting the mains phase therein.

n various implementations, the housing may have a guide portion configured to guide the displacement of the cover when the cover is linked to the housing, the guide portion being preferably formed by an outer surface of the housing. When the cover is displaceable in translation with respect to the housing, the guide portion may thus define a sliding linkage.

In some implementations, the cover may have only two openings and only two connection positions may be reached in translation, one spring-loaded connector (e.g. the third one) being arranged i) on an opposite side of the housing with respect to the other spring-loaded connectors (e.g. the first and second ones) and ii) symmetrically with respect to the other spring-loaded connectors. In such implementations, the cover may be displaced by removing it from the housing, rotating it 180 degrees and remounting it on the housing so as to reach the third connection position through the same opening as for one of the other spring-loaded connectors (e.g. the first or the second one).

Thus, the connection positions and the disconnection position can be reached partly via a rotation of the cover relative to the housing and partly via another displacement, for example a translation, of the cover relative to the housing.

In some implementations, at least two of the openings may be linked by a linking hole such that said at least two openings and the linking hole form a single large opening, which may receive the first, second and third spring-loaded connectors in at least two different locations respectively defining the at least two openings.

In various implementations, the adapter may further comprise an additional spring-loaded connector and an additional opening, the additional spring-loaded connector being linked to the housing, wherein the additional spring-loaded connector may extend at least partially through the additional opening at least when the at least one spring-loaded connector partially extends through the at least one opening; preferably wherein the additional spring-loaded connector may extend at least partially through the additional opening at least when any one of the first, the second and, when present, the third spring-loaded connectors partially extends through a respective opening.

Thus, the additional spring-loaded connector may connect the adapter to a neutral or ground conductor line within the electrical track.

In some embodiments, the additional opening may be formed by a slot extending along all of the at least two openings, preferably along the first, second and third openings.

In some embodiments, the first, the second, the third and/or the additional spring-loaded connector(s) may be soldered directly on a printed circuit board (PCB) of the control circuit, for example of an AC/DC driver, that is housed in the housing.

In various implementations, the housing may be elongated along a longitudinal direction, the housing preferably having a substantially tubular or prismatic shape extending along the longitudinal direction.

Thus, such an elongated housing may be inserted in an elongated electrical rack.

In some implementations, the elongated housing may substantially have a rectangular cross-section, for example a square cross-section, across the longitudinal direction.

In some implementations, the housing and the cover may be designed such that an outer face of the housing is flush with an outer face of the cover.

In various implementations, the adapter may further include a support part configured to support at least one lighting device, the support part being preferably integral with the housing, most preferably one-piece with the housing.

Thus, the support part enable to attach a lighting device to the adapter, for example to the housing.

In some implementations, the at least one lighting device may include a lamp or a LED light source.

In some implementations, the support part may be arranged in an end region of the housing that is located opposite the cover with respect to the housing.

In various implementations, the housing may include a control circuit for controlling power supply to the lighting device.

In some implementations, the control circuit may include a printed circuit board (PCB).

In some implementations, the housing may be hollow so as to house functional components of the housing like the control circuit as the case may be.

In various implementations, the cover may be removably linked to the housing, the housing preferably having a guide portion configured to guide the displacement of the cover when the cover is linked to the housing.

Thus, the cover may be removed from the housing, for example for mounting it in an opposite arrangement when the cover substantially has symmetrical shape. The cover may be placed selectively in one of the connection positions or, as the case may be, in the disconnection position when the cover is linked to the housing, but not when the cover is removed from the housing.

In some implementations, the cover substantially may have the shape of a U. The three wings of the U may be arranged in contact with complementary surfaces of the housing.

In various implementations, the cover may substantially have a symmetrical shape.

Thus, the cover may be arranged on the housing in two different configurations, namely a first configuration and a second configuration opposite the first configuration.

In various implementations, the cover may substantially have an asymmetrical shape, the cover preferably having a flange projecting away from the housing when the cover partially covers the housing.

Thus, the cover may increase the safety of a lighting system, since the flange may prevent an operator from assembling the cover in a wrong way into the electrical track.

A further embodiment of the present invention provides a lighting system comprising an electrical track having mains phases and at least one adapter according to any one of the preceding claims, wherein the at least one adapter has an engaging element configured to engage the electrical track so as to attach the at least one adapter to the electrical track; and wherein the electrical track may define a chamber for receiving the at least one adapter, the at least one adapter being at least partially, preferably completely, inserted into the chamber.

Thus, the lighting system has a simple design that allows safe and flexible assembly of the adapter and the electrical track, notably enabling an operator to select which mains phase the adapter will be connected to when assembled with the electrical track. Further, the lighting system may have a compact design.

n some implementations, the engaging element may effect a snap-fit attachment of the adapter with the electrical track.

In some implementations, the electrical track and the cover may be designed such that an outer face of the electrical track may be flush with an outer face of the cover when the adapter is inserted in the chamber.

In various implementations, the at least one adapter may be of the above-described type with the cover having an asymmetrical shape, and the electrical track may have a shape complementary to the asymmetrical shape of the cover, the electrical track preferably having a recess region that has a shape complementary to the flange of the cover.

Thus, the cover may be fitted in the electrical track in only in one defined orientation.

In some implementations, the electrical track may be made of an electrically insulating material and it may separately hold several electrical conductors, preferably electrically conducting lines, which are independently connected to the respective mains phases.

It has to be noted that all devices, elements, components, members, units and means described in the present application could be implemented in any technically applicable combination of the implementation forms. All steps which are performed by the various entities described in the present application as well as the functionalities described to be performed by the various entities are intended to mean that the respective entity is adapted to or configured to perform the respective steps and functionalities. Even if, in the following description of specific implementations and embodiments, a specific functionality or step to be performed by external entities is not reflected in the description of a specific detailed element of that entity which performs that specific step or functionality, it should be clear for a skilled person that these methods and functionalities can be implemented in any technically applicable combination of the implementation forms.

BRIEF DESCRIPTION OF THE DRAWINGS

The above-described embodiments and implementations of the present invention will be further explained in the following description of specific implementations in relation to the appended drawings, in which.

DETAILED DESCRIPTION

FIGS. 1 to 6 illustrate an adapter 1 for electrically connecting a not shown lighting device to a not shown electrical track having three mains phases, usually designated as L1, L2, L3 and a neutral or ground phase, usually designated as N.

The adapter 1 comprises a housing 2 and a cover 4 configured to partially cover the housing 2 when the cover 4 is arranged on the housing 2.

Figure 7:
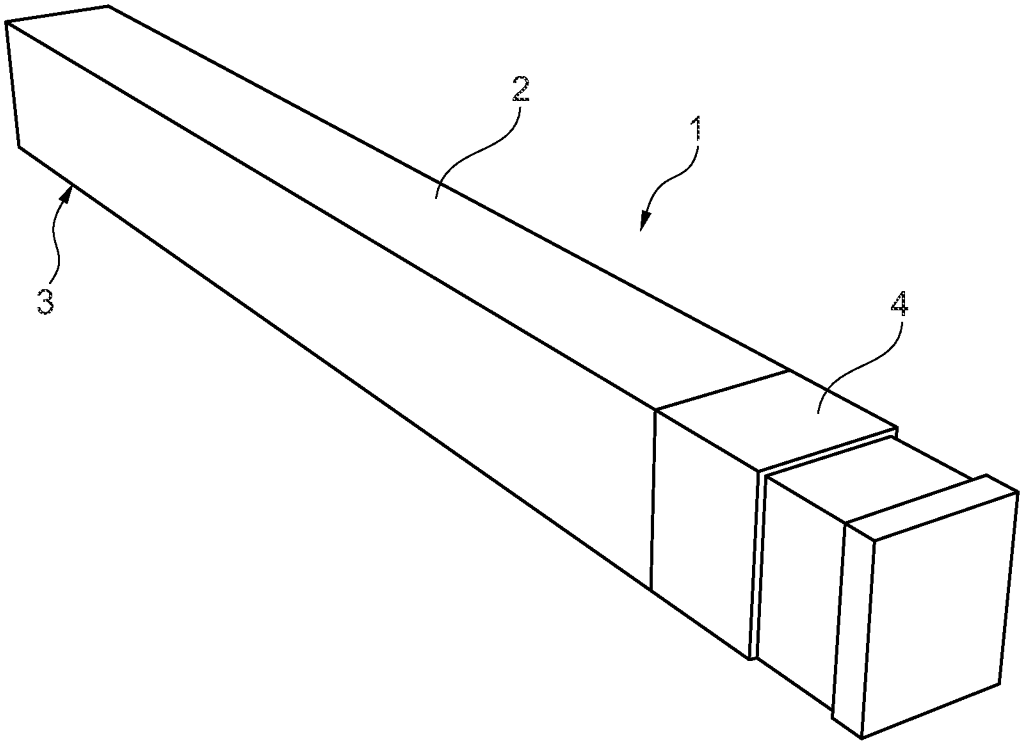
FIG. 7 is a schematic perspective view illustrating the whole adapter of FIGS. 1 to 4.

As visible in FIG. 7, the housing 2 may be elongated and have a substantially prismatic shape extending along a longitudinal direction X2. The housing 2 may substantially have a rectangular cross-section across the longitudinal direction X2.

The adapter 1 may further include a support part 3, which is configured to support the not shown lighting device. The support part 3 may be integral, preferably one-piece, with the housing 2. The support part 3 may be arranged in an end region of the housing 2 that is located opposite the cover 4 with respect to the housing 2. The housing 2 may include a not shown control circuit, for example an AC/DC driver, for controlling power supply to the lighting device. The housing 2 may be hollow so as to house the control circuit.

The cover 4 may substantially have the shape of a U. The three wings of the U may be arranged in contact with complementary planar surfaces of the housing 2 as visible in FIGS. 1 to 6. The housing 2 and the cover 4 may be designed such that an outer face 2.1 of the housing 2 is flush with an outer face 4.1 of the cover 4.

The adapter 1 further comprises a first spring-loaded connector 6.1, a second spring-loaded connector 6.2, and a third spring-loaded connector 6.3. Only the location of the third spring-loaded connector 6.3 is schematically illustrated in FIGS. 3 and 6. The adapter 1 also comprises an additional spring-loaded connector 6.4. In the example of FIGS. 1 to 6, the additional spring-loaded connector 6.4 is a fourth spring-loaded connector. The first, the second, the third and the additional spring-loaded connectors 6.1 to 6.4 may be linked to the housing 2.

The first, the second, the third and/or the additional spring-loaded connectors 6.1 to 6.4 may be soldered directly on a not shown printed circuit board (PCB) of the control circuit, for example of an AC/DC driver, that is housed in the housing 2.

The first and the additional spring-loaded connectors 6.1 and 6.4 may be linked to a first lateral region of the housing 2 (on the right side of FIG. 6). The second and the third spring-loaded connectors 6.2 and 6.3 may be linked to a second lateral region of the housing 2 (on the left side of FIG. 6), which second lateral region is located opposite the first lateral region of the housing 2. The cover 4 may be configured to partially cover those first and second lateral regions of the housing 2.

Figure 3:
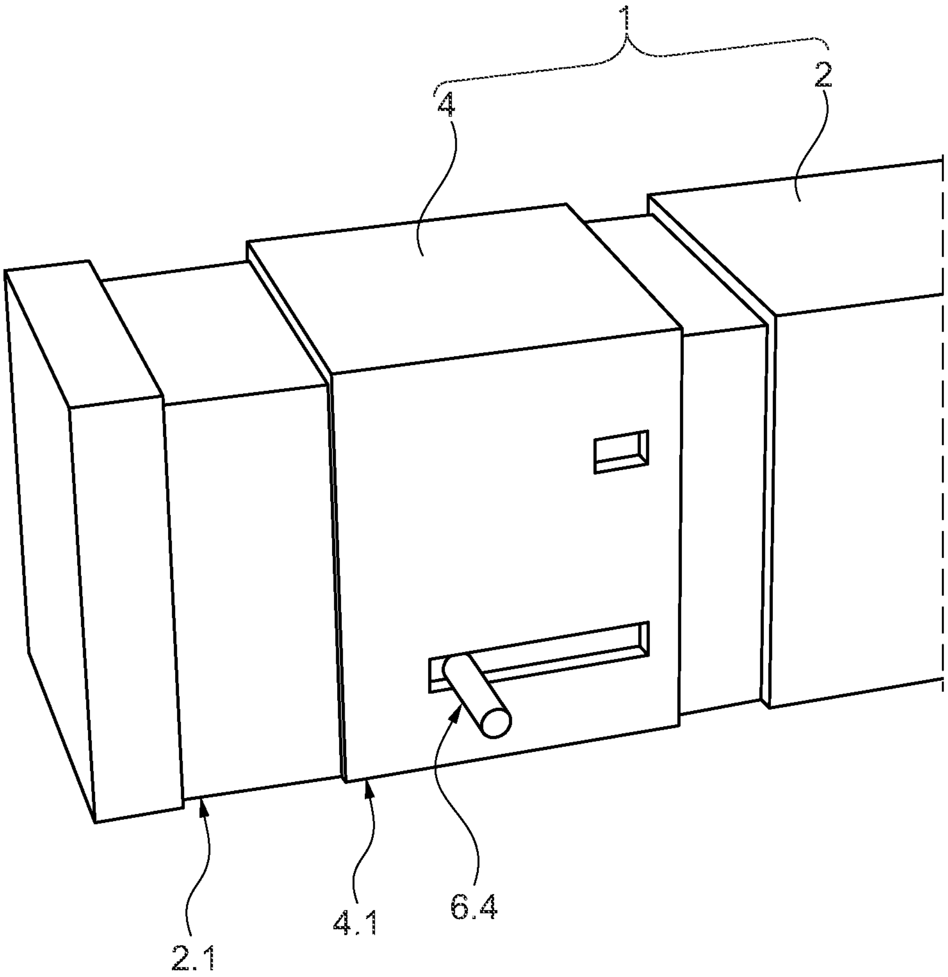
FIG. 3 is a view similar to FIG. 2 and illustrating the part of the adapter of FIG. 2 in a third connection position.
Figure 4:
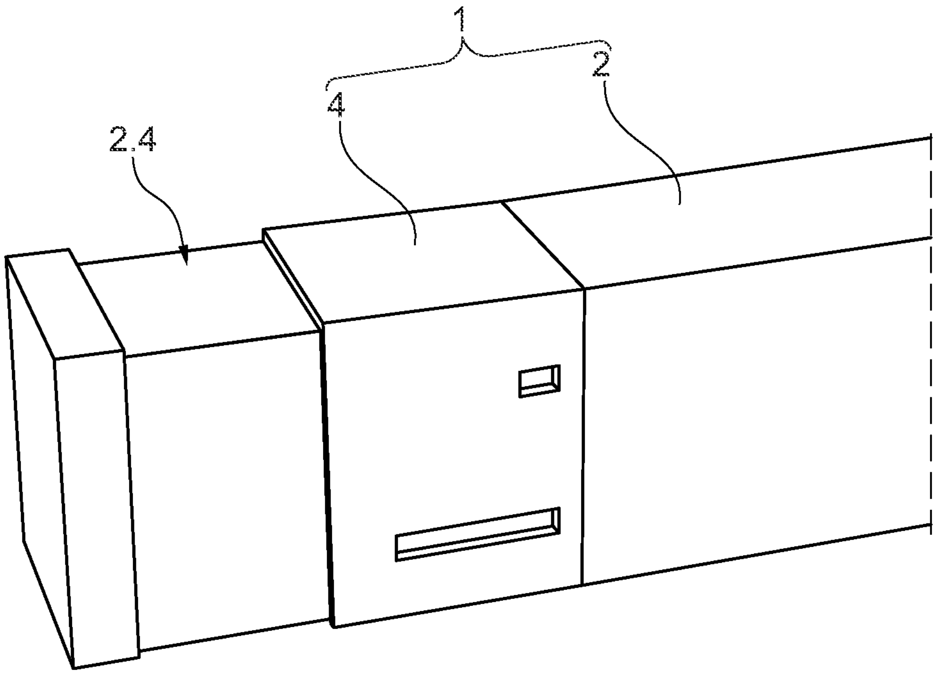
FIG. 4 is a view similar to FIG. 2 and illustrating the part of the adapter of FIG. 2 in a disconnection position.
Figure 5:
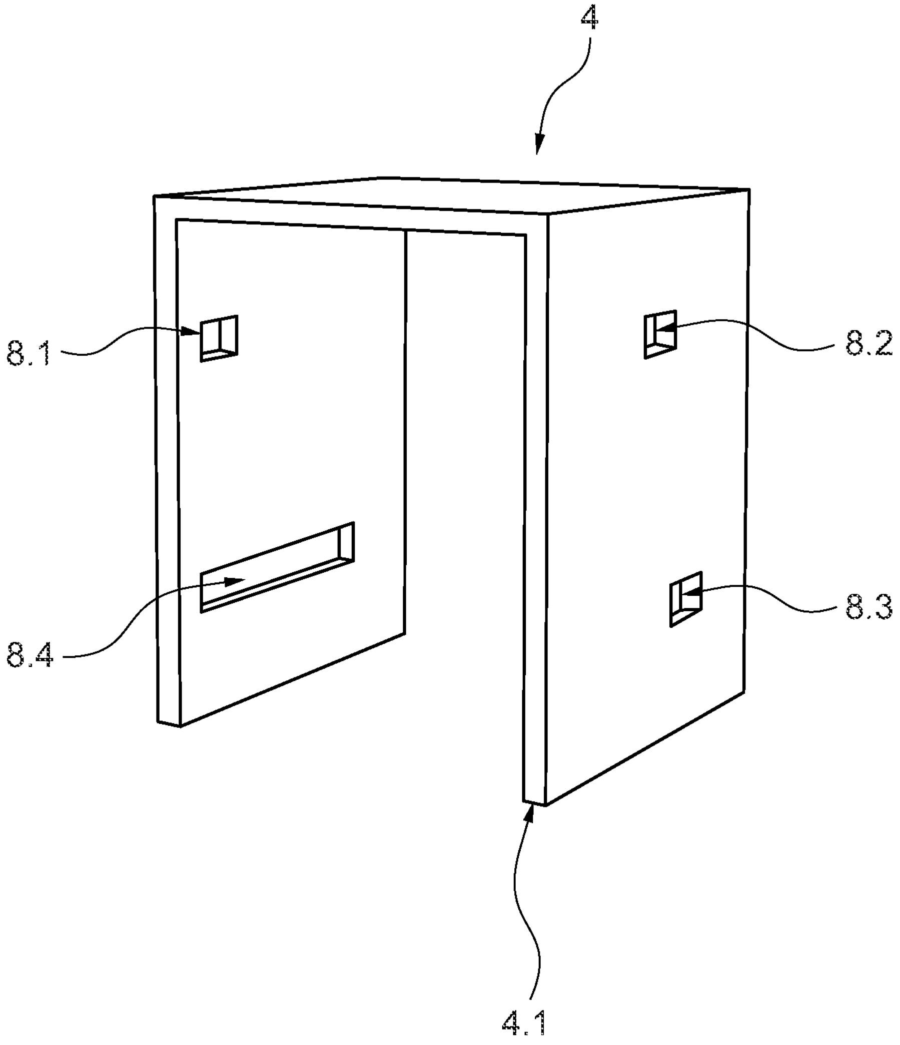
FIG. 5 is a schematic perspective view illustrating the cover of the adapter of FIGS. 1 to 4.
Figure 6:
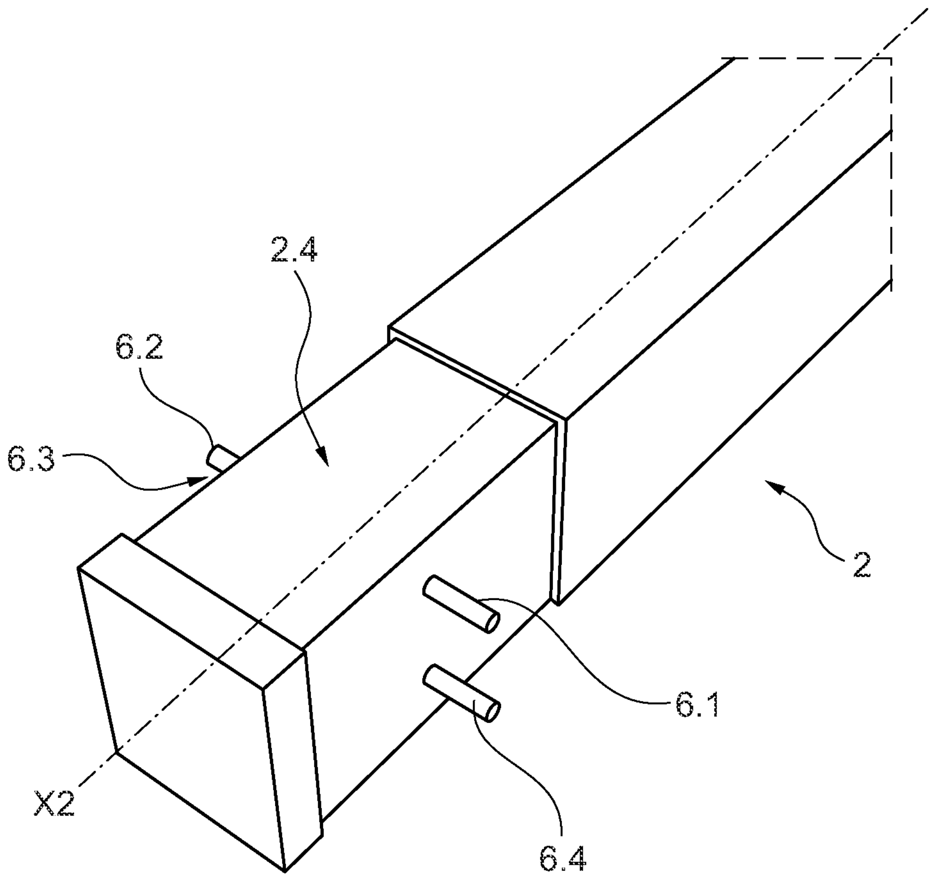
FIG. 6 is a schematic perspective view illustrating the housing of the adapter of FIGS. 1 to 4.

As illustrated in FIG. 5, the cover 4 may have a first opening 8.1, a second opening 8.2, a third opening 8.3 and an additional opening 8.4. In the example of FIGS. 1 to 6, the additional opening 8.4 is a fourth opening. The additional opening 8.4 defines an additional opening with respect to the first, second and third openings 8.1, 8.2 and 8.3. As visible in FIG. 5, the additional opening 8.4 is formed by a slot extending along all of the first, second and third openings 8.1, 8.2 and 8.3.

Figure 1:
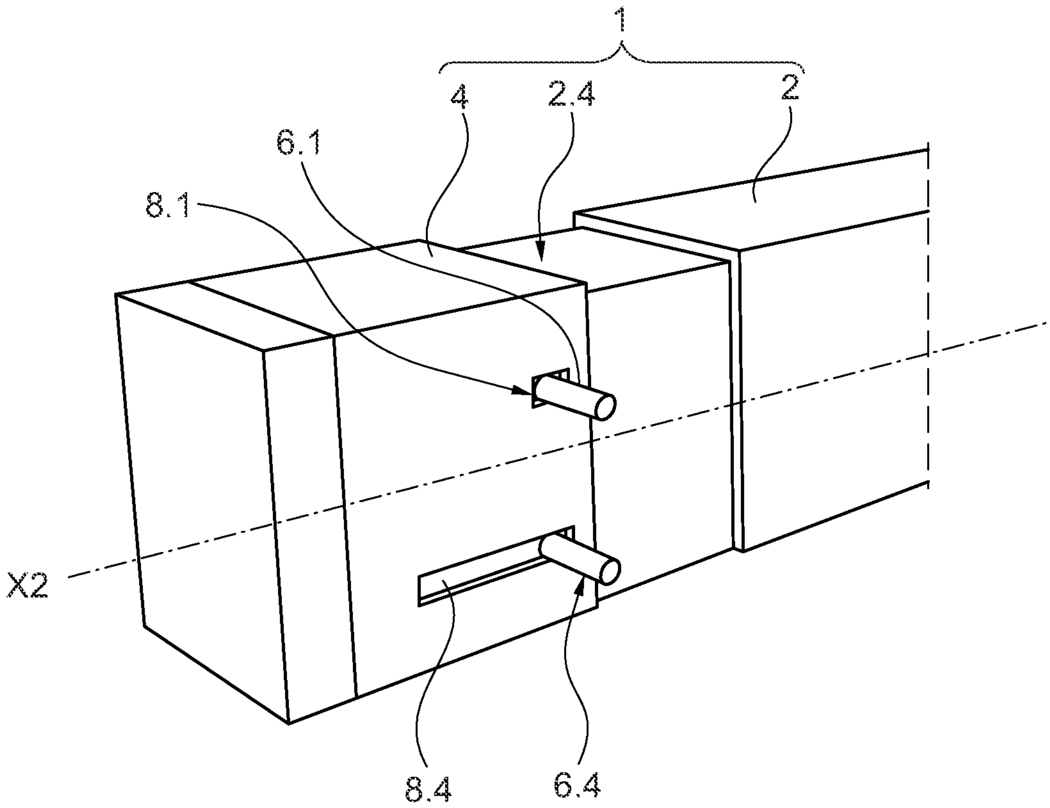
FIG. 1 is a schematic perspective view illustrating a part of an adapter according to an implementation in a first connection position.

FIG. 1 illustrates a first connection position, in which a part of the first spring-loaded connector 6.1 extends through and out of the first opening 8.1 and a part of the additional spring-loaded connector 6.4 extends through and out of the additional opening 8.4. In the first connection position, the adapter 1 may be electrically connected to a first mains phase, say L1, via the first spring-loaded connector 6.1.

Figure 2:
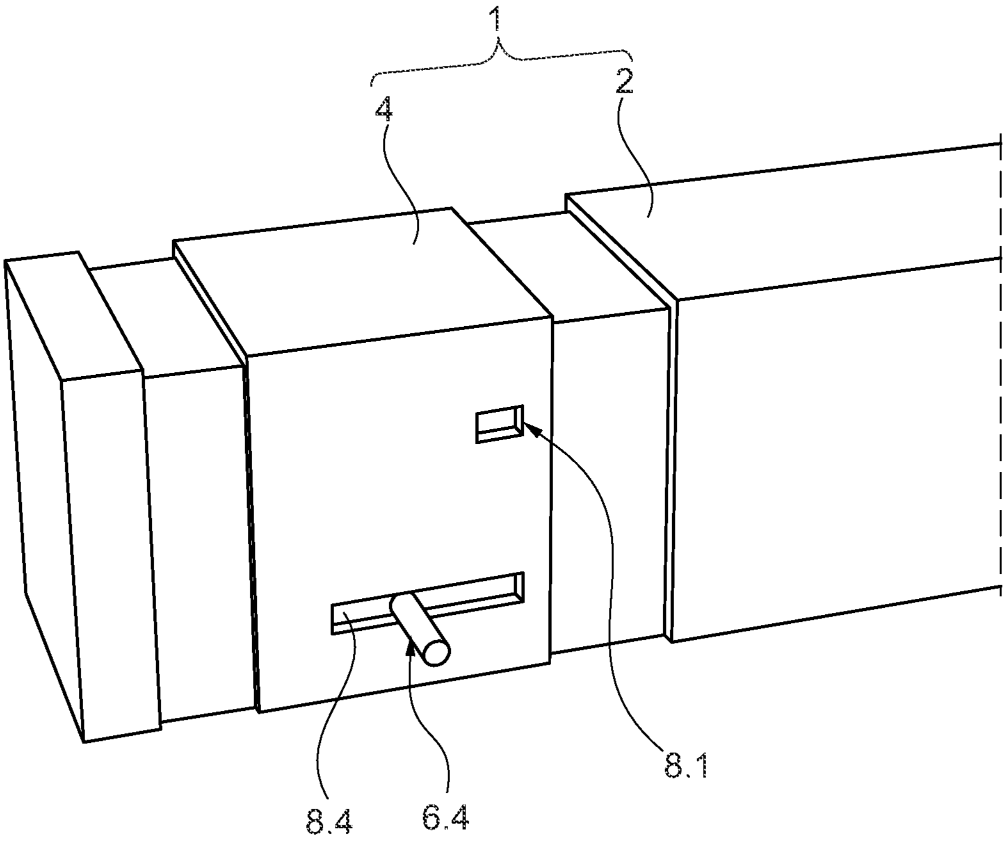
FIG. 2 is a schematic perspective view, at a slightly different angle from FIG. 1, illustrating the part of the adapter of FIG. 1 in a second connection position.

FIG. 2 illustrates a second connection position, in which a part of the second spring-loaded connector 6.2 extends through and out of the second opening 8.2 and a part of the additional spring-loaded connector 6.4 extends through and out of the additional opening 8.4. In the second connection position, the adapter 1 may be electrically connected to a second mains phase, say L2, via the second spring-loaded connector 6.2.

FIG. 3 illustrates a third connection position, in which a part of the third spring-loaded connector 6.3 extends through and out of the third opening 8.3 and a part of the additional spring-loaded connector 6.4 extends through and out of the additional opening 8.4. In the third connection position, the adapter 1 may be electrically connected to a second mains phase, say L3, via the third spring-loaded connector 6.3.

FIG. 4 illustrates a disconnection position, in which the cover 4 covers the first, the second, the third and the additional spring-loaded connectors 6.1 to 6.4. In the disconnection position, the adapter 1 is not electrically connected to any mains phase nor to the neutral wire N, since all of the spring-loaded connectors 6.1 to 6.4 are covered, hence masked, by the cover 4.

The first to third and the additional spring-loaded connectors 6.1 to 6.4 may be elastically movable between a retracted position (not shown) and an extended position (shown in FIGS. 1 to 3 and 6). Each one of the first to third and the additional spring-loaded connectors 6.1 to 6.4 may be i) in its retracted position when it is covered by the cover 2, and ii) in its extended position when it extends through and, in the illustrated implementation, out of a respective one of the first to third and the additional openings 8.1 to 8.4. In the extended position, the respective spring-loaded connector 6.1, 6.2, 6.3 or 6.4 may contact one of the three mains phases L1, L2, L3 or the neutral wire N. For example, the first to third and the additional spring-loaded connectors 6.1 to 6.4 may include a spring or equivalent elastically deformable element and it may be made of or include stainless Steel, spring brass, phosphor bronze or beryllium copper.

The cover 4 is displaceable relative to the housing 2 so as to be placed selectively in one of the first, second, third connection positions (FIGS. 1 to 3). Further, the cover 4 may be displaceable relative to the housing 2 so as to be placed selectively in the disconnection position (FIG. 4).

In the example of FIGS. 1 to 6, the cover 4 may be displaceable relative to the housing 2 in translation i) between the first to three connection positions and the disconnection position and ii) along the longitudinal direction X2. The cover 4 may be displaceable relative to the housing 2 over a distance of 80 mm.

The housing 2 may have a guide portion 2.4, which is configured to guide the displacement of the cover 4 when the cover 4 is linked to the housing 2 as in the configurations of FIGS. 1 to 6. The guide portion 2.4 may be formed by an outer surface of the housing 2 and define a sliding linkage.

The cover 4 may be removably linked to the housing 2. In other words, the housing 2 and the cover 4 may be detached from one another as visible in both FIGS. 5 and 6. For example, the cover 4 may be snap-fitted onto the housing 2 in a detachable manner.

The cover 4 may substantially have a symmetrical shape as visible in FIG. 5. The first to third and the additional openings 8.1 to 8.4 may nevertheless be arranged in an asymmetrical configuration in the cover 4 as in FIG. 5.

In service, an operator may manually displace the cover 4 in order to place it into the selected position, namely either the first, second or third connection position of FIGS. 1 to 3 or the disconnection position of FIG. 4. When displacing the cover 4, a spring-loaded connectors 6.1 to 6.4 may poke out of a respective one of the first to third and the additional openings 8.1 to 8.4. Then, the selected position is reached. Thus, the adapter 1 is put in a configuration where the not shown control circuit may be electrically connected to the mains phase selected among L1, L2 and L3 and/or to the neutral wire N via the relevant one among the first to third and the additional spring-loaded connectors 6.1 to 6.4.

Figure 8:
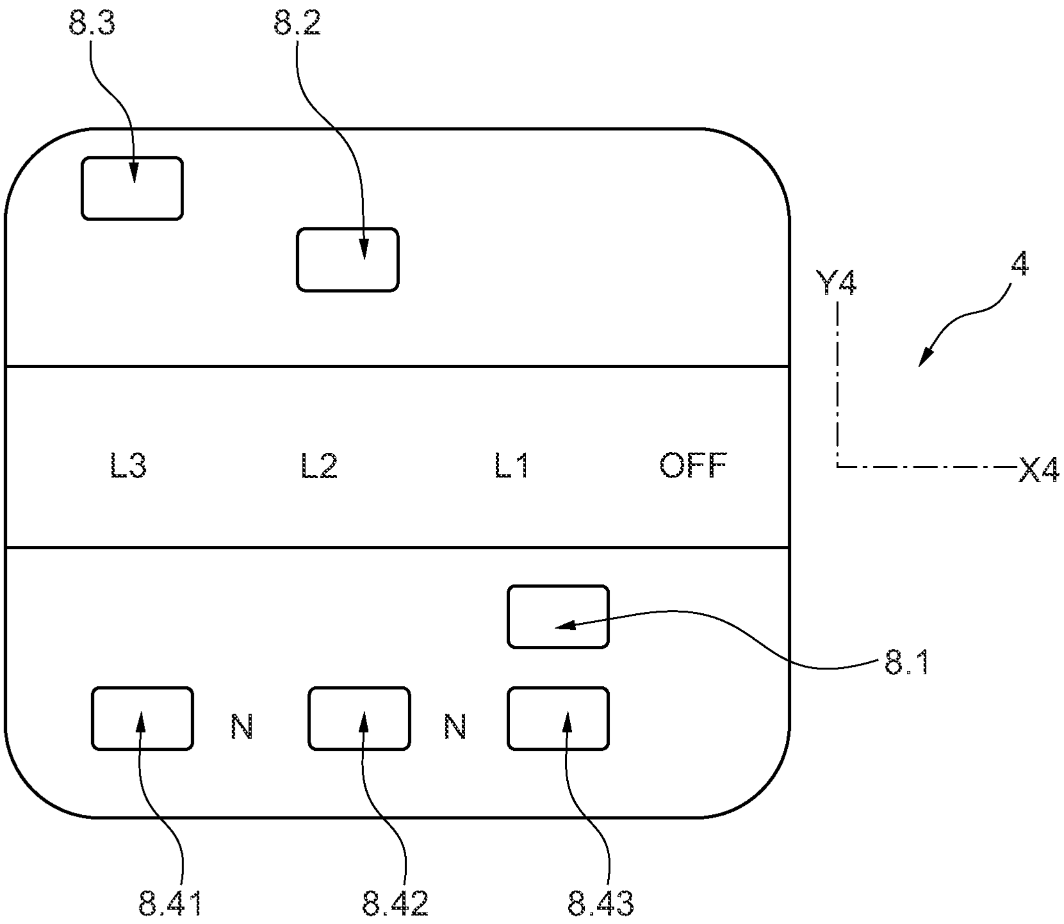
FIGS. 8-9 are schematic representations of covers, in an unfolded state, defining alternatives to the cover of FIGS. 1 to 5.
Figure 9:
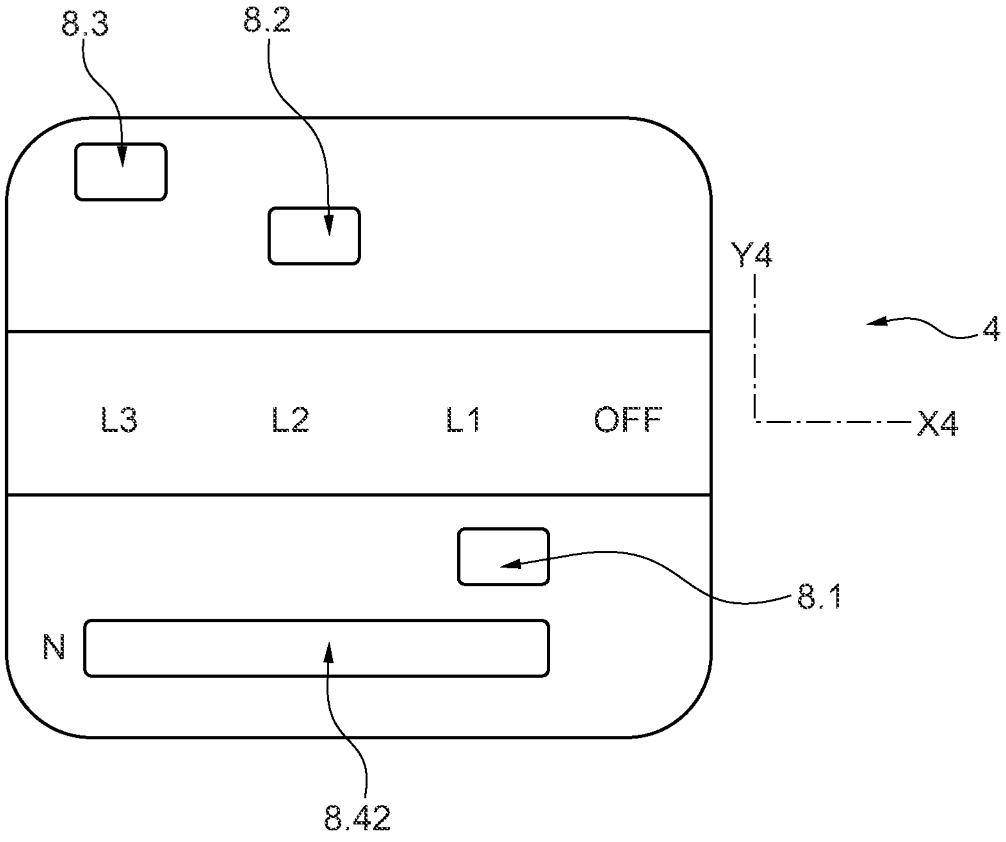

FIGS. 8 and 9 are schematic representations of covers 4, in an unfolded state, defining alternatives to the cover 4 of FIGS. 1 to 4.

The cover 4 of FIG. 8 may provide an alternative scheme for the first, the second, the third and the additional openings 8.1, 8.2, 8.3 and 8.4. The cover 4 of FIG. 8 noticeably differs from the cover 4 of FIGS. 1 to 5 in that the additional opening 8.4 is comprised of three separate openings 8.41, 8.42 and 8.43.

The cover 4 of FIG. 9 may provide another alternative scheme for the first, the second, the third and the additional openings 8.1, 8.2, 8.3 and 8.4. The cover 4 of FIG. 8 noticeably resembles the cover 4 of FIGS. 1 to 5 in that the additional opening 8.4 is formed by a slot extending along all of the first, second and third openings 8.1, 8.2 and 8.3.

In the examples of FIGS. 8 and 9, the first, second and third openings 8.1, 8.2 and 8.3 may be offset both in a lengthwise direction X4 and in a crosswise direction Y4 of the cover 4. Such offset locations contribute to defining the first, second and third connection positions.

As visible on FIGS. 8 and 9, the cover 4 may have signs or marks "L1", "L2, "L3", "N", "OFF" indicating, for example visually, to an operator the locations of the first to third connection positions (FIGS. 1 to 3) and the disconnection position (FIG. 4), in order for the operator to properly connect the first to third and the additional spring-loaded connectors 6.1 to 6.4 to the mains phases L1-L3 and to the neutral wire N.

Figure 10:
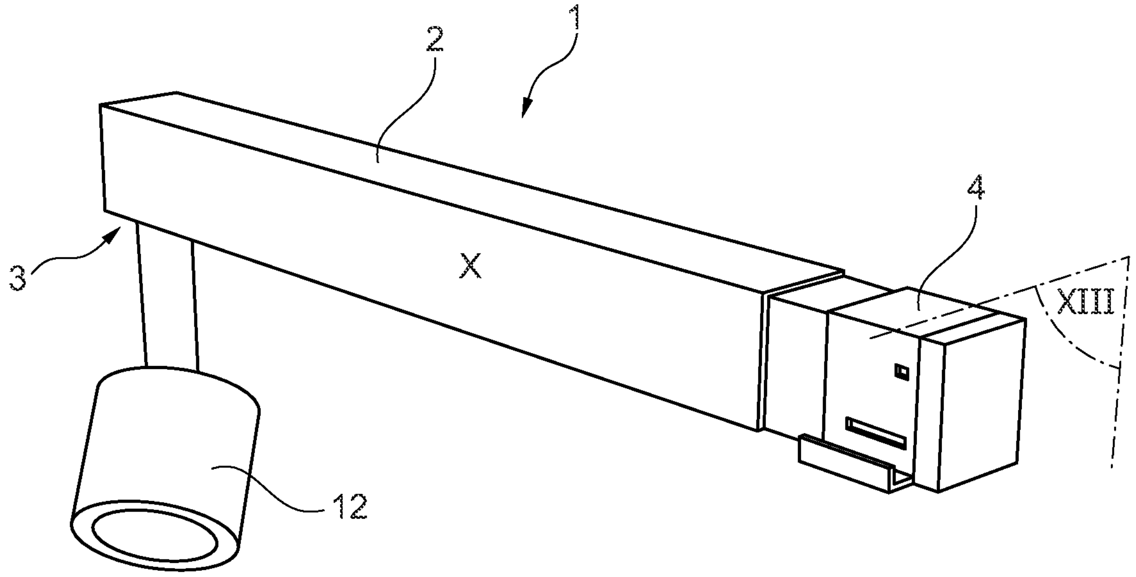
FIG. 10 is a schematic perspective view illustrating an adapter according to another implementation.
Figure 11:
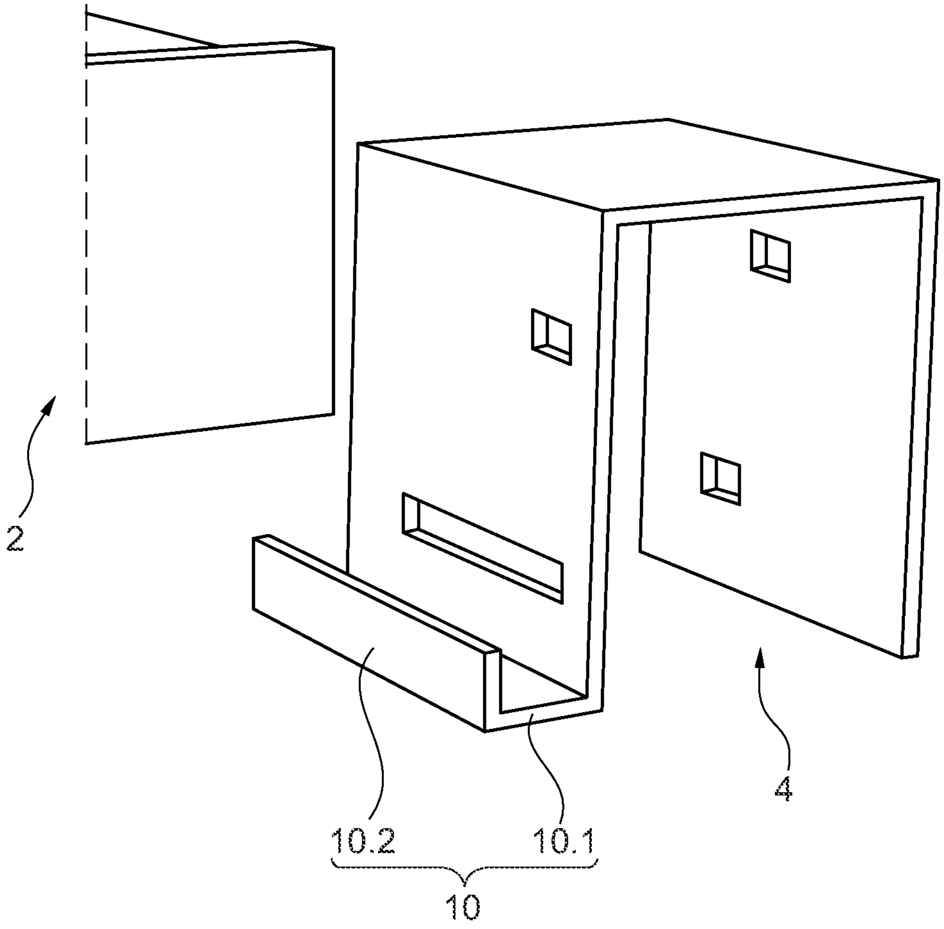
FIG. 11 is a schematic enlarged perspective view of the cover of the adapter of FIG. 10.

FIGS. 10 and 11 illustrate an adapter 1 according to another implementation. Inasmuch as the adapter 1 of FIGS. 10 and 11 is similar to the adapter 1 of FIGS. 1 to 9, the afore-detailed description may be applied to the adapter 1 of FIGS. 1 to 9, except for the hereinafter-mentioned noticeable differences. An element of the adapter 1 of FIGS. 10 and 11 having a structure or function identical or similar to an element of the adapter 1 of FIGS. 1 to 9 is given the same reference sign.

The adapter 1 of FIGS. 10 and 11 mainly differs from the adapter 1 of FIGS. 1 to 9 in that, the cover 4 of FIGS. 10 and 11 may substantially have an asymmetrical shape, whereas the cover 4 in of FIGS. 1 to 9 may substantially have a symmetrical shape, for example the shape of a U.

In particular, the cover 4 of FIGS. 10 and 11 may have a flange 10 projecting away from the housing 2 when the cover 4 partially covers the housing 2, herein when the cover 4 is placed in one of the first, the second and the third connection positions or in the disconnection position. The flange 10 may be formed of two longitudinal wings 10.1 and 10.2, which are perpendicular to one another and thus define a cross-section having substantially the shape of an L.

Besides, there are similarities between the implementations of FIGS. 10 to 13 and of FIGS. 1 to 8, for example in that: The support part 3 may support a lighting device 12, as visible in FIG. 10. The lighting device 12 may include a lamp or a LED light source. The support part 3 may be integral, preferably one-piece, with the housing 2. The support part 3 may be arranged in an end region of the housing 2 that is located opposite the cover 4 with respect to the housing 2.

Figure 12:
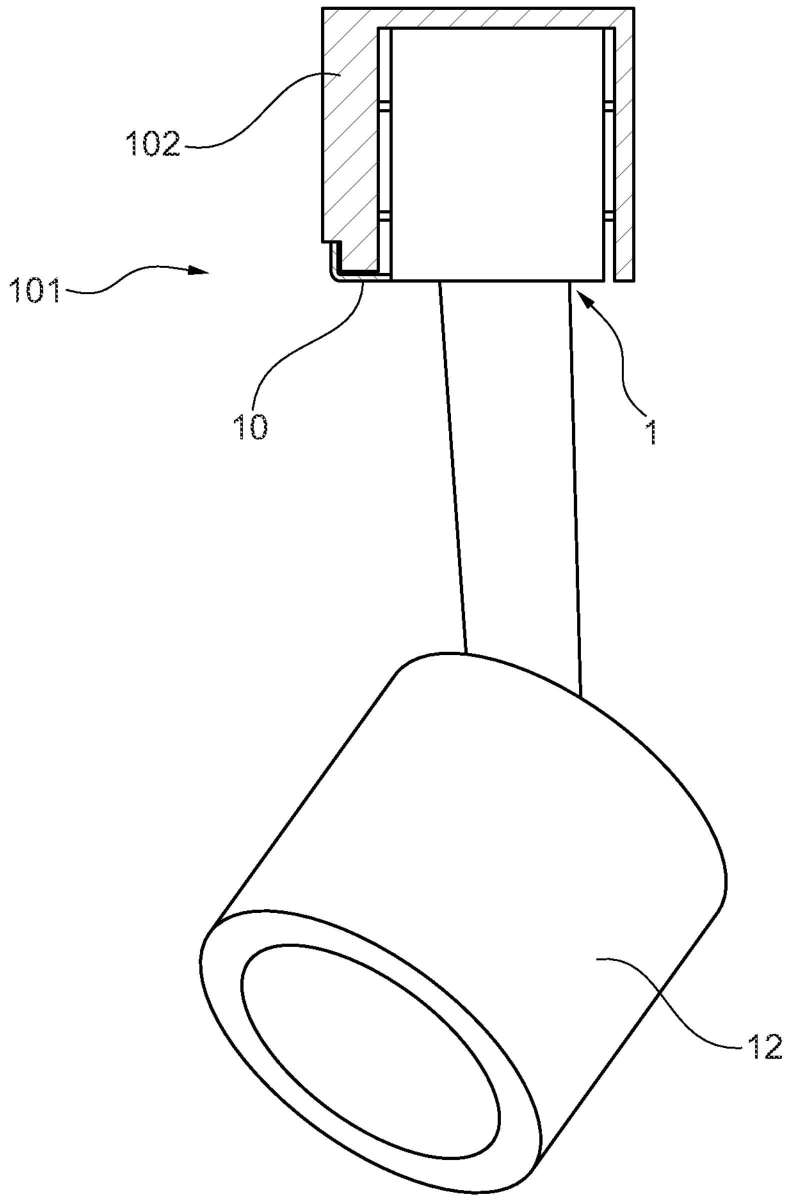
FIG. 12 is a schematic front view of a lighting system comprising the adapter of FIG. 10 and an electrical track.
Figure 13:
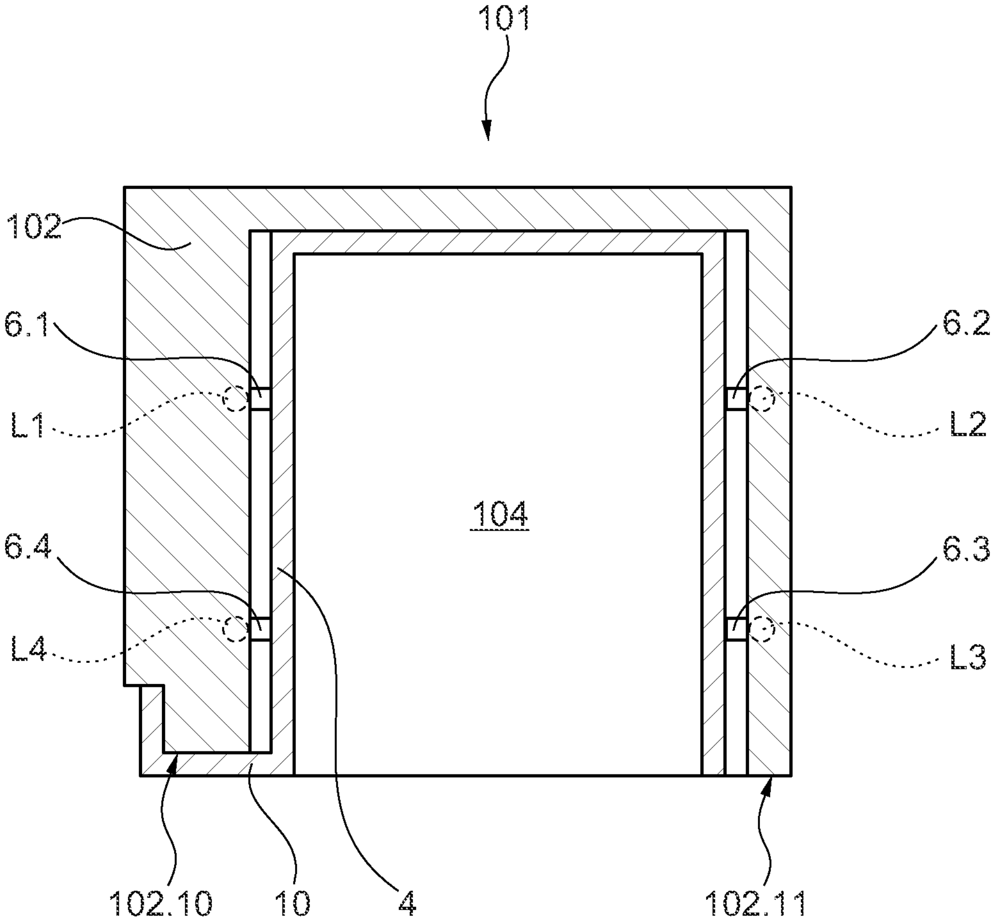
FIG. 13 is a schematic cross-sectional view, in section plane XIII at FIG. 10, of the lighting system of FIG. 12.

FIGS. 12 and 13 illustrate a lighting system 101, which comprises the adapter 4 of FIGS. 10 and 11 as well as an electrical track 102. The cover 4 of FIGS. 10 and 11 may increase the safety of the lighting system 101, since the flange 10 may prevent an operator from assembling the cover 4 in a wrong way on the housing 2.

Besides, the adapter 1 may have a not shown engaging element that is configured to engage the electrical track 102 so as to attach the adapter 1 to the electrical track 102. The engaging element may for example effect a snap-fit attachment of the adapter 1 to the electrical track 102.

The electrical track 102 may be made of an electrically insulating material. The electrical track 102 may separately hold three mains phases represented herein by electrically conducting wires or lines L1, L2 and L3, which are independently connected to the respective mains phases and which are symbolized in FIG. 13. The electrical track 102 may further hold an electrically conducting wire N, which is connected to the neutral or ground and which is symbolized in FIG. 13.

Besides, the electrical track 102 may define a chamber 104 for receiving the adapter 1. The adapter 1 may be completely inserted into the chamber 104 as visible in FIG. 13.

In the example of FIGS. 10 to 13, the electrical track 102 may have a shape complementary to the asymmetrical shape of the cover 4. The electrical track 102 may have a recess region 102.10 that has a shape complementary to the L-shape of the flange 10 of the cover 4.

The electrical track 102 and the cover 4 may be designed such that an outer face 102.1 of the electrical track 102 is flush with an outer face 4.1 of the cover 4 when the adapter 1 is inserted in the chamber 104.

In service, before inserting the housing 2 into the electrical track 102, the cover 4 has to be placed in the disconnection position ("OFF"), in which the cover 4 covers and blocks all spring-loaded connectors 6.1 to 6.4 from contacting any conductor in the electrified track 102. After insertion of the adapter 1 in the electrical track 102, the cover 4 may be displaced in one of the first to third connection positions.

FIGS. 14-17 schematically illustrate two adapters 1 of the type shown in FIG. 10 in various steps for rearranging the cover 4 on one of the adapters 1 and rearranging the adapters 1 in a row before assembling them in a not shown electrical track that may be similar to electrical track 102 of FIGS. 12 and 13.

Figure 14:
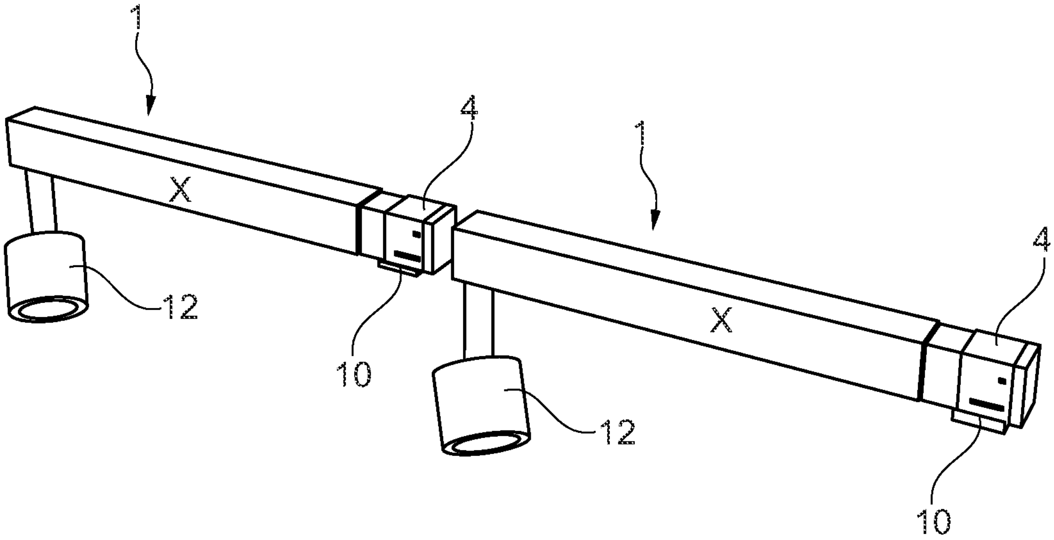
FIGS. 14-17 are schematic perspective views illustrating two adapters akin to FIG. 10 in various steps for rearranging a cover on one of the adapters and rearranging the adapters in a row before assembling them in an electrical track.

FIG. 14 illustrates an initial step, wherein the adapters 1 have been detached from an electrical track akin to electrical track 102, and are kept aligned as in their assembled configuration in the electrical track. In this configuration, the lighting devices 12 are distant from one another.

Figure 15:
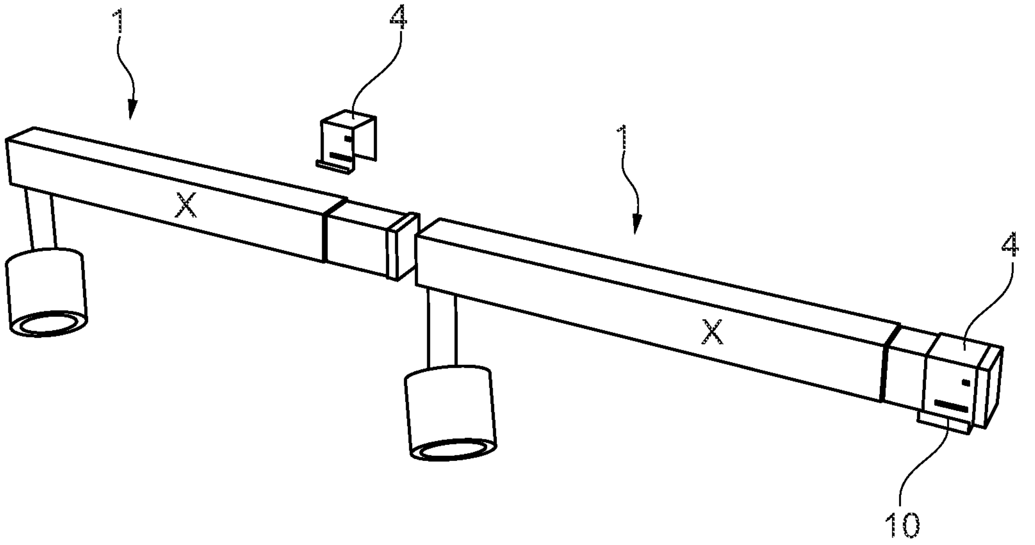

FIG. 15 illustrates a subsequent step, wherein the cover 4 of one of the adapters 1 is removed from the housing 2.

Figure 16:
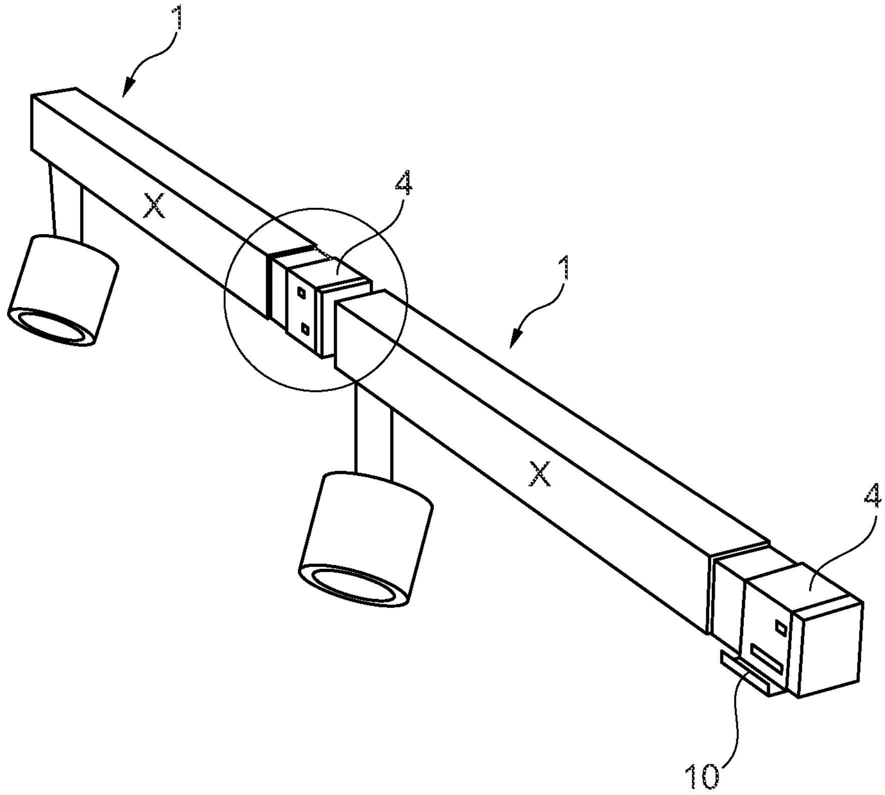

FIG. 16 illustrates a subsequent step, wherein the removed cover 4 has been rotated about a vertical axis by 180 degrees, and then put back in place, for example by snap-fitting, on the housing 2. Thus, the adapter 1 has been modified. As visible in FIG. 16, the flange 10 formed in the cover 4 of the modified adapter 1 is oriented opposite the flange 10 of the other cover 4.

In this configuration, the oppositely-oriented flange 10 prevents the modified adapter from being inserted in the electrical track. In other words, the rotated cover 4 ensures that the right mains phase remains selected when the modified adapter 1 will be reinserted in the electrical track.

Figure 17:
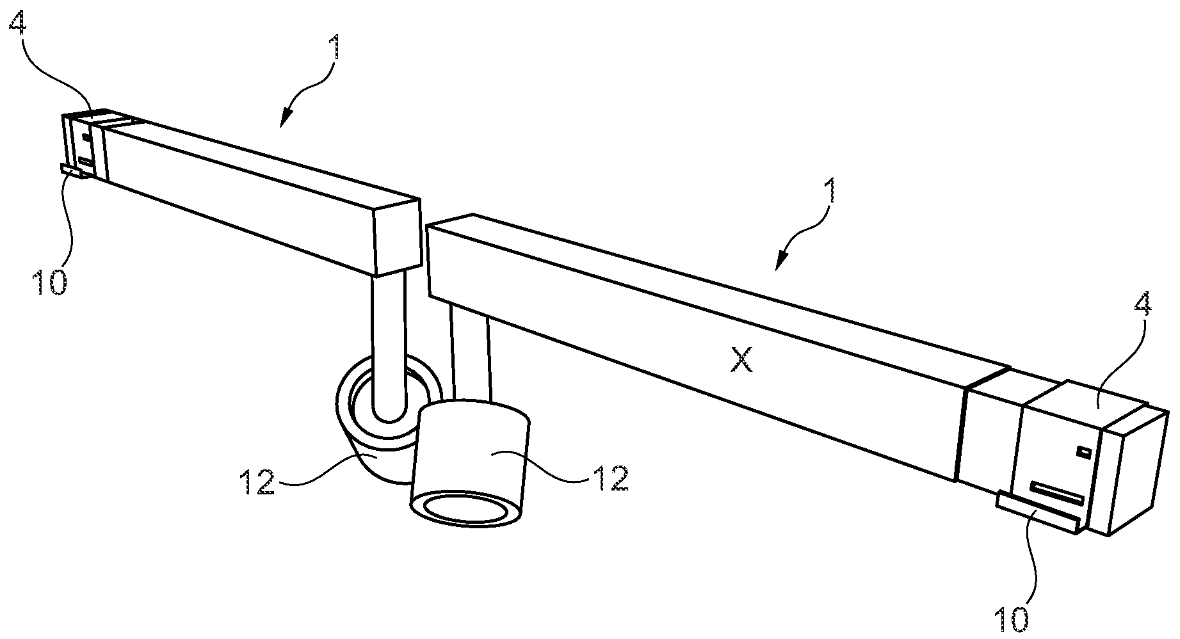

FIG. 17 illustrates a subsequent step, wherein the modified adapter 1 is rotated about a vertical axis by −180 degrees, hence in a direction opposite the rotation of the rotated cover 4. As visible in FIG. 17, both flanges 10 are oriented on the same side of the adapters 1. Thus, the adapters 1 may be inserted again in the electrical track. After insertion, the lighting devices 12 lie next to one another.

Each adapter 1 of FIGS. 14 to 17 may have two groups of spring-loaded connectors 6.1 to 6.4, each group being located on a respective longitudinal side of the adapter 1. In this way, the rotated adapter 1 as in FIG. 17 may still contact the mains phases L1, L2, L3 or N in the electrical track.

In a lighting system including at least two adapters 1, the distance between two successive lighting devices 12, for example two luminaire heads, is defined by the length of an adapter 1. This distance may be minimal in the configuration of FIG. 17.

In a non-illustrated implementation, an adapter for electrically connecting a lighting device to an electrical track having mains phases may comprise:

housing, one spring-loaded connector, for example similar to the first spring-loaded connector 6.1, that may be linked to the housing, instead of the spring-loaded connectors 6.1 to 6.4, and a cover configured to partially cover the housing, the cover having one opening, for example similar to the first opening 8.1, instead of the openings 8.1 to 8.4.

The cover may be displaceable relative to the housing so as to be placed selectively in at least one of:

a position in which the spring-loaded connector extends at least partially through the opening; this position being for example similar to the position of FIG. 3, hence a connection position for connecting the adapter to a mains phase, say to L1; and a position in which the cover covers the spring-loaded connector; this position being for example similar to the position of FIG. 4, hence a disconnection position.

In another non-illustrated implementation, an adapter for electrically connecting a lighting device to an electrical track having mains phases may comprise two spring-loaded connectors, i.e.:

a first spring-loaded connector linked to the housing, for example similar to the first spring-loaded connector 6.1, and a second spring-loaded connector linked to the housing for example similar to the second spring-loaded connector 6.2.

The cover may have two openings, for example respectively similar to the first opening 8.1 and to the second opening 8.2. The cover may be displaceable relative to the housing so as to be placed selectively at least in one of:

a first connection position, in which the first spring-loaded connector extends at least partially through a respective opening while the cover covers the second spring-loaded connector, for connecting the adapter to a mains phase or to the neutral and a second connection position, in which the second spring-loaded connector extends at least partially through a respective opening while the cover covers the first spring-loaded connector, for connecting the adapter to another mains phase or to the neutral.

The cover may further be displaceable relative to the housing so as to be placed in a disconnection position, similar to the position of FIG. 4.

In a variant to the preceding non-illustrated implementation, the adapter may further comprise an additional spring-loaded connector, for example similar to the additional spring-loaded connector 6.4, and the cover may have an additional opening, for example similar to the additional opening 8.4.

In yet another non-illustrated implementation, an adapter for electrically connecting a lighting device to an electrical track having mains phases may be similar to the adapter 1 illustrated in FIGS. 1 to 6, with the noticeable difference that the additional spring-loaded connector may be arranged in a top position of the housing and away from the cover, for example like the ground contactor 26 in FIG. 1 of EP3217090A1. As the cover cannot cover the additional spring-loaded connector, the additional spring-loaded connector may always contact a correspondingly arranged neutral wire within the electrical track.

Preferably, the additional spring-loaded connector is arranged in a median, top position of the housing, and the electrical track is symmetrical, such that the additional spring-loaded connector may still contact a correspondingly arranged neutral wire after a rotation of 180 degrees of the housing with respect to the electrical track.

The present invention has been described in conjunction with various implementations, embodiments and aspects as non-limiting examples. However, other variations can be understood and effected by persons skilled in the art practicing the claimed invention, from the studies of this disclosure, the drawings and the claims. In the claims as well as in the description the word "comprising" or "including" does not exclude other elements or steps, and the indefinite article "a" or "an" does not exclude a plurality. A single element or other unit may fulfill the functions of several entities or items recited in the claims.

What is claimed is:

1. An adapter (1), for electrically connecting a lighting device (12) to an electrical track (102) having mains phases (L1, L2, L3), the adapter (1) comprising at least:

a housing (2), at least one spring-loaded connector (6.1) linked to the housing (2), and a cover (4) configured to partially cover the housing (2), the cover (4) having at least one opening (8.1), wherein the cover (4) is displaceable relative to the housing (2) so as to be placed selectively in at least one of:

a position in which the at least one spring-loaded connector (6.1) extends at least partially through the at least one opening (8.1), a position in which the cover (4) covers the at least one spring-loaded connector (6.1).

2. The adapter (1) according to claim 1 wherein the at least one opening (8.1) is a first opening (8.1), and the adapter (1) comprising at least:

a first spring-loaded connector (6.1) linked to the housing (2), and a second spring-loaded connector (6.2) linked to the housing (2), wherein the cover (4) has at least the first opening and a second opening (8.1-8.2), wherein the cover (4) is displaceable relative to the housing (2) so as to be placed selectively at least in one of:

a first connection position, in which the first spring-loaded connector (6.1) extends at least partially through the first opening (8.1) while the cover (4) covers the second spring-loaded connector (6.2), and a second connection position, in which the second spring-loaded connector (6.2) extends at least partially through the second opening (8.2) while the cover (4) covers the first spring-loaded connector (6.1).

3. The adapter (1) according to claim 2, further comprising a third spring-loaded connector (6.3) linked to the housing (2), wherein the cover (4) is displaceable relative to the housing (2) so as to be placed selectively in at least one of:

the first connection position, in which the first spring-loaded connector (6.1) extends at least partially through a respective the first opening (8.1) while the cover (4) covers the second and third spring-loaded connectors (6.2, 6.3), the second connection position, in which the second spring-loaded connector (6.2) extends at least partially through the second opening (8.2) while the cover (4) covers the first and third spring-loaded connectors (6.1, 6.3), and a third connection position, in which the third spring-loaded connector (6.3) extends at least partially through a respective-third opening (8.3) while the cover (4) covers the first and second spring-loaded connectors (6.1, 6.2).

4. The adapter (1) according to claim 2, further comprising a third spring-loaded connector (6.3) linked to the housing (2), wherein the first and the second and the third openings (8.1, 8.2) are arranged on the cover (4) such that:

in the first connection position, the first spring-loaded connector (6.1) extends at least partially through the first opening (8.1), in the second connection position, the second spring-loaded connector (6.2) extends at least partially through the second opening (8.2), and in the third connection position, the third spring-loaded connector (6.3) extends at least partially through the third opening (8.3) while the cover (4) covers the first and second spring-loaded connectors (6.1, 6.2).

5. The adapter (1) according to claim 2, wherein at least one of the first, the second and, when present, a third spring-loaded connectors (6.3) is linked to a first lateral region of the housing (2), the remaining spring-loaded connectors (6.2, 6.3) being linked to a second lateral region of the housing (2) located opposite the first lateral region of the housing (2), the cover (4) being configured to partially cover the first and second lateral regions of the housing (2).

6. The adapter (1) according to claim 1, wherein the cover (4) is displaceable relative to the housing (2) so as to be placed selectively in a disconnection position, in which the cover (4) covers the at least one spring-loaded connector, including, when respectively present, a first, a second and a third spring-loaded connectors (6.1, 6.2, 6.3).

7. The adapter (1) according to claim 1, wherein the cover (4) is displaceable relative to the housing (2) in translation at least between said two positions.

8. The adapter (1) according to claim 3, further comprising a fourth spring-loaded connector (6.4) and a fourth opening (8.4), the fourth spring-loaded connector (6.4) being linked to the housing (2), wherein the fourth spring-loaded connector (6.4) extends at least partially through the fourth opening (8.4) at least when the one of the first, second or third spring-loaded connectors partially extends through the respective first, second or third opening.

9. The adapter (1) according to claim 1, wherein the housing (2) is elongated along a longitudinal direction (X2), the housing (2) having a substantially tubular or prismatic shape extending along the longitudinal direction (X2).

10. The adapter (1) according to claim 1, wherein the adapter (1) further includes a support part (3) configured to support at least one lighting device (12), the support part (3) being integral with the housing (2.

11. The adapter (1) according to claim 1, wherein the housing (2) includes a control circuit for controlling power supply to the lighting device (12).

12. The adapter (1) according to claim 1, wherein the cover (4) is removably linked to the housing (2), the housing (2) preferably having a guide portion (2.4) configured to guide the displacement of the cover (4) when the cover (4) is linked to the housing (2).

13. The adapter (1) according to claim 1, wherein the cover (4) substantially has a symmetrical shape.

14. The adapter (1) according to claim 1, wherein the cover (4) substantially has an asymmetrical shape, the cover (4) having a flange (10) projecting away from the housing (2) when the cover (4) partially covers the housing (2).

15. The lighting system comprising an electrical track (102) having mains phases (L1, L2, L3) and at least one adapter (1) according to claim 1, wherein the at least one adapter (1) has an engaging element configured to engage the electrical track (102) so as to attach the at least one adapter (1) to the electrical track (102); and wherein the electrical track (102) defines a chamber (104) for receiving the at least one adapter (1), the at least one adapter (1) being at least partially inserted into the chamber (104).

16. The lighting system according to claim 15, wherein the at least one adapter (1) is according to claim 14, and wherein the electrical track (102) has a shape complementary to the asymmetrical shape of the cover (4), the electrical track (102) having a recess region (102.10) that has a shape complementary to the flange (10) of the cover (4).

17. The adapter (1) according to claim 7, wherein said translation at least between said two positions is between a first connection position, a second connection position and a third connection position.

* * * * *